(12) United States Patent
Henning (10) Patent No.: US 11,125,293 B2
(45) Date of Patent: Sep. 21, 2021

(54) BRAKE DEVICE FOR A UTILITY VEHICLE (71) Applicant: WABCO Europe BVBA, Brussels (BE)

(72) Inventor: Paul Henning, Schwetzingen (DE)

(73) Assignee: WABCO EUROPE BVBA

( * ) Notice: Subject to any disclaimer, the term of this patent is extended or adjusted under 35 U.S.C. 154(b) by 0 days.

(21) Appl. No.: 16/651,423

(22) PCT Filed: Oct. 16, 2017

(86) PCT No.: PCT/EP2017/076311
§ 371 (c)(1),
(2) Date: Mar. 27, 2020

(87) PCT Pub. No.: WO2019/076426
PCT Pub. Date: Apr. 25, 2019

(65) Prior Publication Data
US 2020/0284311 A1   Sep. 10, 2020

(51) Int. Cl.
*F16D 65/62* (2006.01)
*F16D 65/095* (2006.01)
(Continued)

(52) U.S. Cl.
CPC .......... *F16D 65/62* (2013.01); *F16D 65/095* (2013.01); *F16D 66/023* (2013.01); *F16D 2066/001* (2013.01); *F16D 2125/28* (2013.01)

(58) Field of Classification Search
CPC ........ F16D 55/227; F16D 65/18; F16D 65/38; F16D 65/40; F16D 65/62; F16D 65/66;
(Continued)

(56) References Cited

U.S. PATENT DOCUMENTS 5,848,673 A * 12/1998 Strauss ................. F16D 65/568
188/1.11 L
6,354,407 B1 * 3/2002 Heinlein ................. F16D 65/18
188/71.1
(Continued)

FOREIGN PATENT DOCUMENTS

AT  516801 A2   8/2016
EP  2927068 A2  10/2015
WO 2010133463 A1 11/2010

OTHER PUBLICATIONS

European Patent Office, Rijswijk, Netherlands, International Search Report of International Application No. PCT/EP2017/076311, dated Jul. 6, 2018, 3 pages.

*Primary Examiner* — Robert A. Siconolfi
*Assistant Examiner* — San M Aung
(74) *Attorney, Agent, or Firm* — Dickinson Wright PLLC (57) ABSTRACT

A brake device (102), in particular a utility vehicle disc brake, has a brake disc (106), at least one brake pad (104, 104'), a transmission member (114) coupled to the brake pad (104, 104') for pressing the brake pad (104, 104') against the brake disc (106), a drive for generating a drive variable, a non-linear mechanism (110) operatively connected to the drive and the transmission member (114) for transmission of the drive variable to the transmission member (114), and an adjusting unit (120) for adjusting a clearance (108) between the transmission member (114) and the brake disc (106). The device includes a brake pad wear sensor for detecting the degree of wear of the brake pad (104, 104') and a control unit, with a signal-carrying connection to the sensor to vary the clearance (108) as a function of the wear of the brake pad (104, 104') determined by the sensor.

16 Claims, 4 Drawing Sheets (51) Int. Cl.
*F16D 66/02* (2006.01)
*F16D 66/00* (2006.01)
*F16D 125/28* (2012.01)

(58) Field of Classification Search
CPC .... F16D 65/183; F16D 65/568; F16D 65/095; F16D 66/023; F16D 2065/386; F16D 2066/001; F16D 2066/003; F16D 2121/14; F16D 2121/24; F16D 2125/24; F16D 2125/26; F16D 2125/28; F16D 2125/32; F16D 2125/68; F16D 2127/007; F16D 2127/10; B60T 7/042
USPC .................. 188/71.8, 72.1, 72.2, 158, 1.11 R
See application file for complete search history.

(56) References Cited

U.S. PATENT DOCUMENTS

| | | | |
|---|---|---|---|
| 2005/0039988 A1 | 2/2005 | Philpott | |
| 2012/0168264 A1* | 7/2012 | Putz | F16D 65/66 188/71.8 |
| 2015/0114771 A1* | 4/2015 | Putz | B60T 7/042 188/158 |
| 2015/0330470 A1* | 11/2015 | Siebke | F16D 55/2255 188/1.11 L |

\* cited by examiner

BRAKE DEVICE FOR A UTILITY VEHICLE

TECHNICAL FIELD

The present disclosure relates to a brake device, in particular a utility vehicle disc brake, having a brake disc, at least one brake pad for producing a braking effect on the brake disc, a transmission member coupled to the brake pad for pressing the at least one brake pad against the brake disc, a drive for generating a drive variable, a non-linear mechanism connected to the drive and the transmission member for non-linear transmission of the drive variable to the transmission member and an adjusting unit for adjusting a clearance between the transmission member and the brake pad.

BACKGROUND

Brake devices having drives for generating a drive torque are widely known in the automotive industry, particularly in the utility motor vehicle sector. Thus AT 516801 A2, for example, discloses such a brake device having an electromechanical brake actuator. The aim is generally to actuate braking by means of electrical energy. One challenge is to achieve sufficiently short brake actuation times and at the same time to obtain a desired braking performance by means of the smallest and most economical electric motor possible. For this purpose, AT 516801 A2 proposes an electro-mechanical actuator which comprises two transmission members. A coupling member, on which a tracer element is arranged, is provided on the first transmission member. The second transmission member comprises a lifting cam. The tracer element follows the lifting cam, the second transmission member applying the input torque for the first transmission member.

The aforementioned systems have the disadvantage, however that the design construction is of great complexity, which on the one hand is cost-intensive in terms of production and assembly and on the other is not easy to service. With such systems it is also generally challenging to provide a consistently high braking effect as the brake pads wear.

SUMMARY

Against this background, the object of the present invention was to specify a brake device which as far as possible overcomes the disadvantages described above. In particular, the object was to specify a brake device which for the minimum possible outlay in terms of equipment also affords a high braking performance as the brake pads wear, whilst at the same time minimizing the component complexity and the drive power required.

The present disclosure achieves its fundamental object in a brake device of the aforementioned type in that the device comprises a brake pad wear sensor for detecting the degree of wear of the at least one brake pad, and control unit which has a signal-carrying connection to the sensor and is adapted to vary the clearance as a function of the wear of the brake pad determined by the sensor.

The present disclosure relates in particular to disc brakes, the mating part corresponding to the brake pad in a disc brake being the brake disc. In principle, however, the present disclosure may also be employed in the context of drum brakes, in which the brake lining is situated opposite the brake drum.

The present disclosure exploits the finding that a variation in the clearance can be used to keep the brake application force of a brake constant for a given drive torque as the wearing of the brake pads increases, or to keep the drive torque constant for a given, required brake application force as the wearing of the brake pads increases. The term clearance is here generally taken to mean the play in any area of the chain of actuation between the mechanism and the brake pad, in the state in which the brake is not being actuated.

It has been recognized that, particularly in the case of utility vehicle disc brakes having relatively large lining thicknesses on the brake pads, the stiffness of the brake system increases surprisingly sharply as the brake pad wear increases. This has to do with the fact that the brake pad pressed against the brake disc by the brake actuator has an inherently lower material stiffness than the transmission member moving the pad. The smaller the thickness of the brake pad, the greater the effect exercised by the stiffness of the transmission member on the transmission of force from the actuator to the brake disc, which results in the increase in brake stiffness described above. Once the brake pad has come into contact with the brake disc, therefore, with the greater brake stiffness relative to the stroke of the transmission member, there is relatively a more rapid increase discernible in the brake application force. If the same brake application force is to be achieved despite the greater increase in the brake application force as brake wear becomes more pronounced, the drive power must be increased in order to be able to press sufficiently against the mating part, for example the brake disc. With the present disclosure it now becomes possible, for the first time, to vary the clearance so that the point of initial contact between the brake pad and the corresponding mating part is manipulated as a function of the wear in such a way that the drive functions in a favorable working range.

This affords the advantage that, overall, even as the wearing of the brake pads increases, a lesser increase in the drive power is sufficient to ensure the availability of a constant braking force.

The present disclosure is developed in that the non-linear mechanism is adapted to move the transmission member between a retracted position and an extended position along a stroke travel X, the stroke travel X resulting from a transmission function of the drive variable. The drive variable is preferably an angle of rotation generated by a drive torque.

The mechanism preferably defines the transmission function, and the transmission function is defined therein as the ratio $H(\alpha)$ between input variable (here: drive variable $\alpha$) and output variable (here: stroke travel X) in such a way that although H increases as the drive variable increases, the rate of variation of H diminishes as the drive variable increases.

The mechanism preferably has a first working range and a second working range, the rate of variation of the transmission function in the second working range being less than in the first working range. It is furthermore preferred that the first working range (I) merge continuously into the second working range (II). The transition between the working ranges I and II is preferably smooth, in particular with no abrupt break.

The non-linear mechanism is thereby preferably designed so that, in order to move the brake pad in the direction of the brake disc the transmission member, large stroke travels of the transmission member can initially be achieved for small variations of the drive variable in the first working range, whereas in the second working range, greater working variable variations are confronted with a smaller variation in the stroke of the transmission member. If there were a constant force acting on the transmission member in opposition to the stroke, the drive power needed, for example a drive torque, would be lower in the second working range than in the first working range.

The control unit is preferably adapted to increase the clearance as the wearing of the brake pad increases. If increasing wear of the brake pad leads to increased brake stiffness, it is now possible, through an increase in the clearance, for the transmission member to come into contact with the brake pad and the brake disc only in the second working range of the non-linear mechanism, with a greater transmission of force and lower rate of advance. The increase in drive power is then less pronounced than in the case of an invariable, small clearance, or remains constant.

This affords the advantage that the increasing brake stiffness due to wearing of the at least one brake pad is at least partially compensated for by shifting the point of contact into the second working range. Conversely, there is therefore the resulting advantage that drives having a lower torque, which as a rule are smaller and more energy-saving, can be used for such a brake, without having to forfeit the achievable braking force as the wearing of the brake pads increases.

The present disclosure is advantageously developed in that the control unit is adapted to increase the clearance linearly as a function of the degree of wear of the at least one brake pad.

In an alternative embodiment the increase in the clearance occurs progressively or degressively as a function of the degree of wear of the at least one brake pad.

The present disclosure is advantageously developed in that the adjusting unit comprises a screw actuator for adjusting the clearance. Such a screw actuator allows a sensitive variation and adjustment of the clearance for relatively low component complexity and high reliability. The screw actuator preferably comprises a base body having an internal thread and an adjusting element having an external thread, a rotation of the adjusting element relative to the base body producing a translational movement of the adjusting element.

The present disclosure is advantageously developed in that this comprises a temperature sensor for detecting the temperature of the at least one brake pad, the control unit having a signal-carrying connection to the temperature sensor and being adapted to vary the clearance as a function of the temperature of the brake pad determined by the sensor. Besides the degree of wear of the brake pads, their temperature, in particular, may also show an influence on the brake stiffness. In this respect the brake pad temperature constitutes a further measurable variable which is used for adjusting the clearance. Once again, this affords the overall advantage that an existing drive torque can be optimally translated into the highest possible, constant braking force, taking into account a number of ambient and wear conditions.

It is furthermore preferred that the clearance be increased as the temperature of the brake pad diminishes. A lower brake pad temperature typically leads to an increase in the brake stiffness. To this extent it is advantageous, viewed in the context of the non-linear mechanism, for the transmission member to come into contact with the brake pad or the brake disc in the second torque range of the mechanism when brake temperatures are lower, in order in this case to transmit greater contact pressures for a given drive torque.

The present disclosure has been described above with reference to a brake device. In a further aspect the present invention further relates to a method for operating a brake device, particularly a utility vehicle disc brake.

The present disclosure achieves the aforementioned object in respect of an operating method, in that this comprises the following steps: generating a drive variable, in particular a drive angle, preferably via a drive such as an electric motor, for example; non-linear transmission of the drive variable to a transmission member, in particular by a non-linear mechanism such as a cam-disc mechanism; detecting the degree of wear of at least one brake pad of the brake device, for example via a brake pad wear sensor; and varying a clearance between the transmission member and the brake disc as a function of the detected degree of wear of the at least one brake pad.

Such a method has the same advantages as the brake device according to the present disclosure and preferably has the same preferred embodiments and developments.

The present disclosure is developed by one, more or all of the following steps:

moving the transmission member between a retracted position and an extended position along a stroke travel, the stroke travel resulting from a transmission function of the drive variable, the drive variable preferably being an angle of rotation generated by a drive torque;

increasing the clearance as the wearing of the brake pad increases, preferably linearly, progressively or degressively;

detecting the temperature of the at least one brake pad, for example via a temperature sensor; and/or varying the clearance as a function of the temperature of the brake pad, preferably increasing the clearance as the temperature of the brake pad diminishes and/or reducing the clearance as the temperature of the brake pad increases.

Exemplary embodiments of the present disclosure are now described below, referring to the drawings. These are not necessarily intended to represent the exemplary embodiments to scale, the drawings, where useful by way of explanation, instead being executed in schematic and/or slightly distorted form. For supplementary details of the teachings directly perceivable from the drawings, reference is made to the relevant prior art. It is to be borne in mind here that a variety of modifications and changes to the form and detail of an embodiment can be made without departing from the general idea of the present disclosure. The features of the present disclosure disclosed in the description, in the drawings and in the claims may be essential, both individually and in any combination, for the development of the present disclosure. Moreover, the scope of the present disclosure encompasses all combinations of at least two of the features disclosed in the description, the drawings and/or the claims. The general idea of the present disclosure is not limited to the precise form or detail of the preferred embodiments shown and described hereinafter, nor is it confined to a subject matter which would be restricted in comparison to the subject matter claimed in the claims. In the case of specified ranges of measurements, values lying within the stated limits are also intended to be disclosed as limit values and to be freely insertable and claimable. For the sake of simplicity, the same reference numerals are used below for identical or similar parts or parts having an identical or similar function.

Further advantages, features and details of the present disclosure emerge from the following description, the preferred embodiment and from the following figures.

DETAILED DESCRIPTION OF THE DRAWINGS

Figure 1:
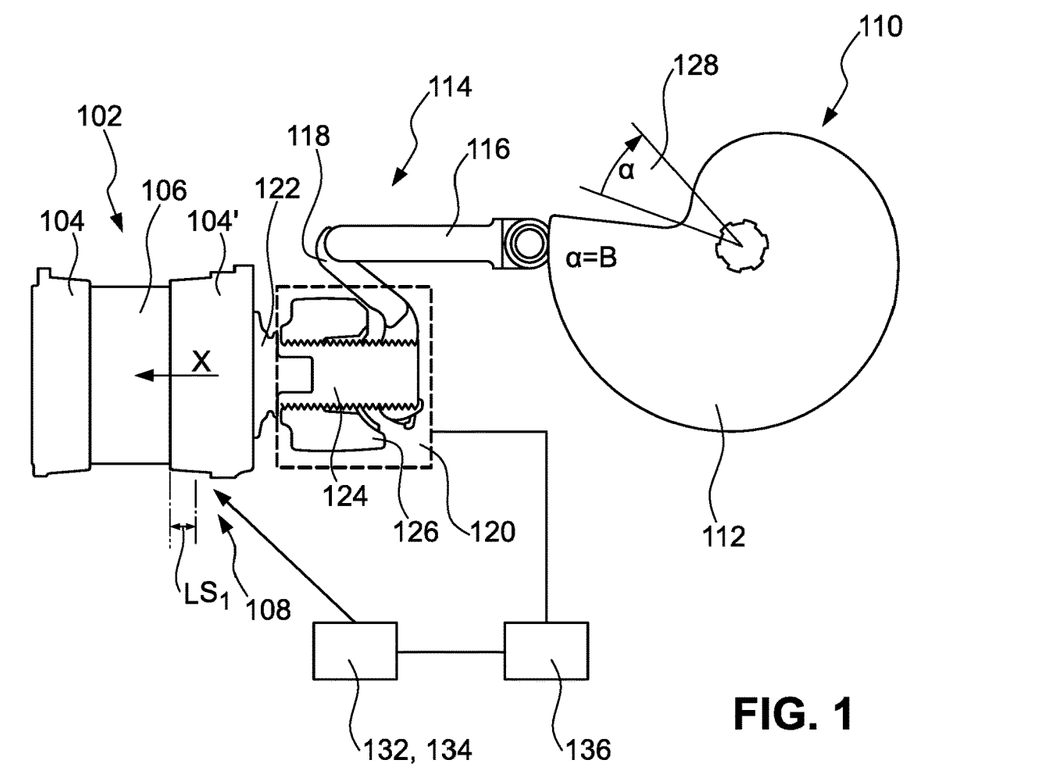
FIG. 1 shows a schematic side view of a first exemplary embodiment of a brake device according to the present disclosure.

FIG. 1 shows a brake device 102, which comprises brake pads 104, 104', a brake disc 106, an adjusting unit 120, a transmission member 114 and a non-linear mechanism 110. The transmission member 114 comprises a tappet 116, for example. The non-linear mechanism 110 here comprises a cam disc 112, which is coupled to a drive. The drive is an electric motor, for example, which provides an angle of rotation $\alpha$ as drive variable. The drive, via a drive torque, produces an angular rotation, which is transmitted to a tappet 116 by the cam disc 112, the tappet 116 sliding on the surface of the cam disc 112. The gradient of the cam disc 112 here varies as a function of the angle of rotation 128 (cf. also FIG. 2 for detailed comments on this). The cam disc 112 serves to translate a rotational movement of the drive about the angle $\alpha$ into a translational movement of the brake tappet 116. In FIG. 1 the cam disc 112 has been turned by its maximum amount $\alpha=B$. The cam disc 112 thereby deflects the tappet 116 in the state shown in FIG. 1 by its maximum stroke travel X. The tappet 116 is coupled to an eccentric lever 118, which in turn acts via an adjusting unit 120 on the brake pads 104, 104'. In the position shown in FIG. 1 and with the brake pad in an unworn state, the tappet 116, via the transmission member 114 and via the adjusting unit 120, presses the brake pads 104, 104' against the brake disc 106 with maximum brake application force.

The adjusting unit 120 serves to adjust this clearance. For this purpose, the adjusting unit 120 comprises a base body 126 and a screw spindle 124. The base body 126 has an internal thread, the screw spindle 124 having a corresponding external thread. Through rotation of the screw spindle 124 it is possible to vary a zero stroke and thereby the translational position of the brake pad where $\alpha=0$. In the prior art the clearance would hereby be kept to a minimum as the brake pad wear increases, in order to achieve a rapid application of a brake application force on actuation of the brake. According to the present disclosure the opposite ensues, as is described below.

Figure 2:
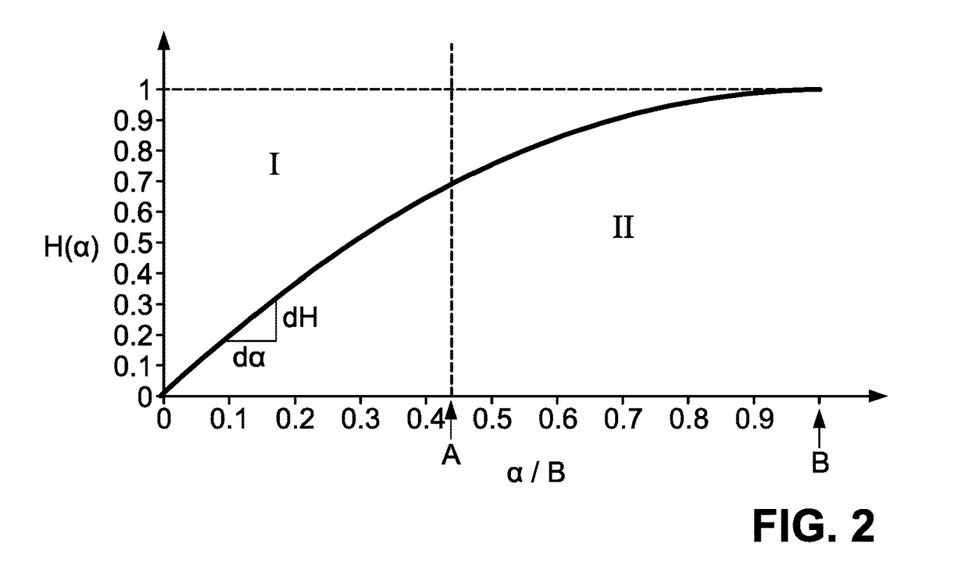
FIG. 2 shows a transmission function of the brake device, in particular of the mechanism, according to FIG. 1.

In FIG. 2 a transmission function $H(\alpha)$ of the cam disc 112 is represented as a function of the drive variable, the angle of rotation $\alpha$. The transmission function has two working ranges I and II, which merge continuously one into the other. A variation in the angle of rotation $\alpha$ of the cam disc 112 in the first working range leads to a greater variation in the force transmission and therefore deflection of the tappet 116 than in the adjoining second working range, since the cam disc thickness increases more sharply in the first working range I than in the second working range II. At the same time this means that for a given drive torque in the first working range I a lower force is applied to the brake tappet 116, or that a smaller drive torque has to be applied for a given, required brake tappet force.

If the angle of rotation of the cam disc is increased further, the increase in thickness diminishes. In this range, the same variation in the angle of rotation as in the first working range I would lead to the tappet 116 being deflected only by a shorter distance, since the cam disc gradient in this range is lower. Another result of this, however, is that the force transmitted from the drive to the tappet in this range would increase for a given drive torque. To sum up, therefore, the cam disc 112 allows a non-linear transmission of the drive torque to the tappet 116 and ultimately to the brake pads 104, 104'.

Figure 3:
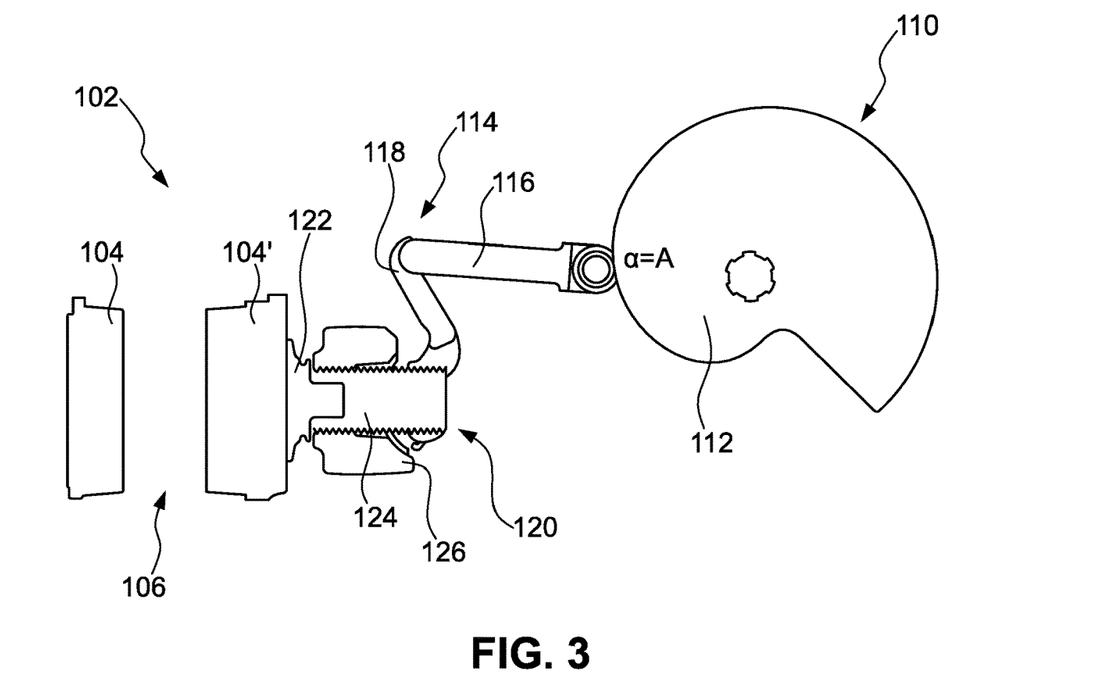
FIG. 3 shows the exemplary embodiment of the brake device according to the present disclosure in FIG. 1 in an operating state in which the brake pads are worn.

FIG. 3 now shows a state in which the brake pads 104, 104' are worn but the clearance 108 has not yet been adjusted. As can be seen from the figure, the cam disc 112, owing to the increased brake stiffness, here already reaches the point of maximum brake application force at an angle of rotation of $\alpha=A$ and A<B. Since A still lies in the first working range I of the transmission function $H(\alpha)$ and the cam disc thickness increases more sharply in this range, however, a greater drive power, that is to say a greater drive torque, is necessary.

Figure 4:
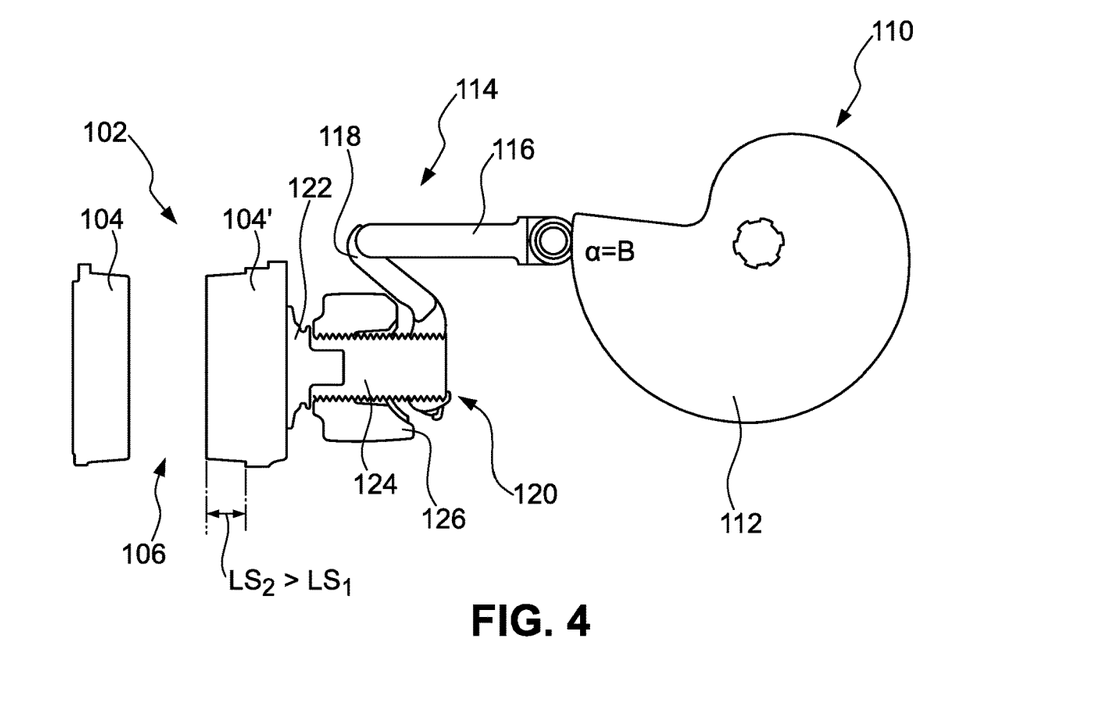
FIG. 4 shows the exemplary embodiment of the brake device according to the present disclosure in FIG. 1 in a further operating state with worn brake pads with adjusted clearance.

In FIG. 4, on the other hand, the clearance 108 has now been increased for the same state of wear of the brake pads 104, 104'. Consequently, the cam disc 112 now comes into bearing contact with the brake disc 106 only after covering a larger idle travel, so that despite the increased brake stiffness the maximum brake application force lies in the second working range of the transmission function $H(\alpha)$, ideally about where $\alpha=B$, where the cam disc gradient is shallowest. As a result, the cam disc 112 in this operating range transmits the maximum brake application force with lower drive torque to the tappet 116 and thereby ultimately to the brake disc 106, as in the situation represented in FIG. 3. An increase in the clearance, as shown in FIG. 4, therefore means that the cam disc is being operated in a range in which the force transmitted to the tappet 116 is at a maximum relative to the drive power and is thereby suited to compensate, at least partially, for the increasing brake stiffness resulting from the wear.

Figure 5:
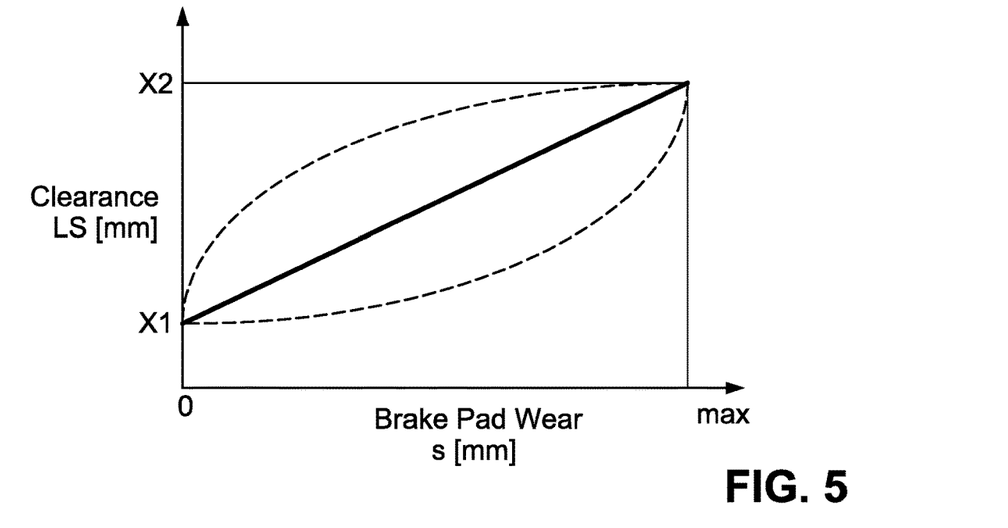
FIG. 5 shows an adjustment function of the clearance as a function of the wearing of the brake pads.

Finally, in FIG. 5 the clearance is plotted over the brake pad wear. As can be seen from the figure, there are various options for adjusting the clearance as a function of the brake pad wear. A linear increase in the clearance as a function of the pad wear, in particular, presents itself here (solid line), or alternatively a non-linear adjustment.

Figure 6:
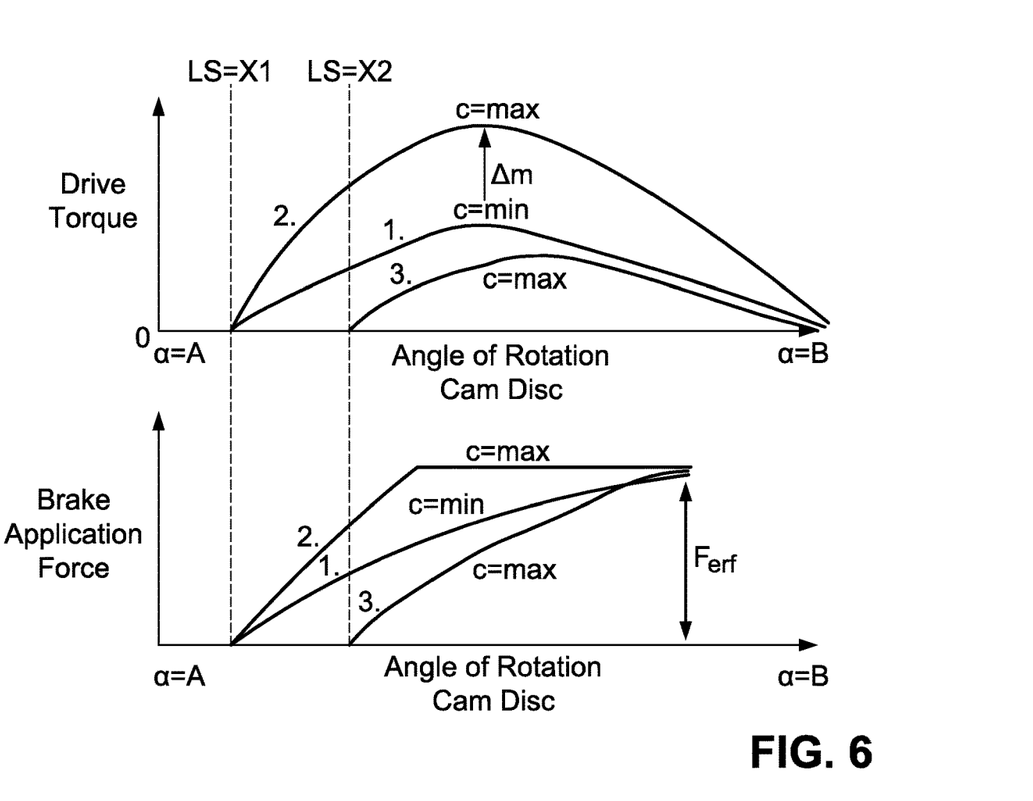
FIG. 6 shows diagrams, in which the drive torque and the brake application force are each plotted over the angle of rotation of a cam disc for different brake stiffnesses.

In FIG. 6 the drive torque and the brake application force are each plotted over the angle of rotation of the cam disc. Referring to the upper diagram, in which the drive torque is plotted over the angle of rotation of the cam disc, three curves 1 to 3 are first plotted in the diagram. In the case of curves 1 and 2, the clearance has a value X1 (cf. also FIG. 5 with regard to this). For curve 1 the brake has a brake stiffness c=min, as is representative of unworn brake pads. Curve 2, on the other hand, represents a state in which the brake stiffness c assumes a maximum value c=max, which can occur, for example, with worn brake pads. It now becomes clear from the diagram that the drive torque needed to achieve a required brake application force $F_{erf}$ for a constant clearance LS=X1 increases significantly with increasing brake stiffness, that is to say by the value Δm.

As can be seen from the bottom diagram represented in FIG. 6, in which the brake application force is plotted over the angle of rotation of the cam disc, the cam disc for curve 1 (c=max) is still situated in the first working range I of the transmission function H(α). Here the cam disc thickness increases more sharply as a function of the angle of rotation α, so that owing to the high rate of variation of the transmission function H(α) with greater brake stiffness a correspondingly greater drive power, that is to say a greater drive torque, is needed in order to obtain the required brake application force $F_{erf}$. The brake application force $F_{erf}$ is already achieved at a smaller angle of rotation of the cam disc.

In the case of curve 3 an increase in the clearance from LS=X1 to LS=X2 has now been undertaken for a likewise maximum brake stiffness c=max. The result of the increase in the clearance is that the cam disc now comes into bearing contact with the brake disc only after covering a larger idle travel, so that despite greater brake stiffness the maximum brake application force lies in the second working range II of the transmission function H(α), ideally about where α=B, where the gradient of the cam disc am is shallowest. Consequently, the drive torque needed to achieve a required brake application force $F_{erf}$ is less than with a smaller clearance LS=X1 and worn brake pads where c=max, and even less than with unworn brake pads where c=min and a smaller clearance LS=X1.

Figure 7:
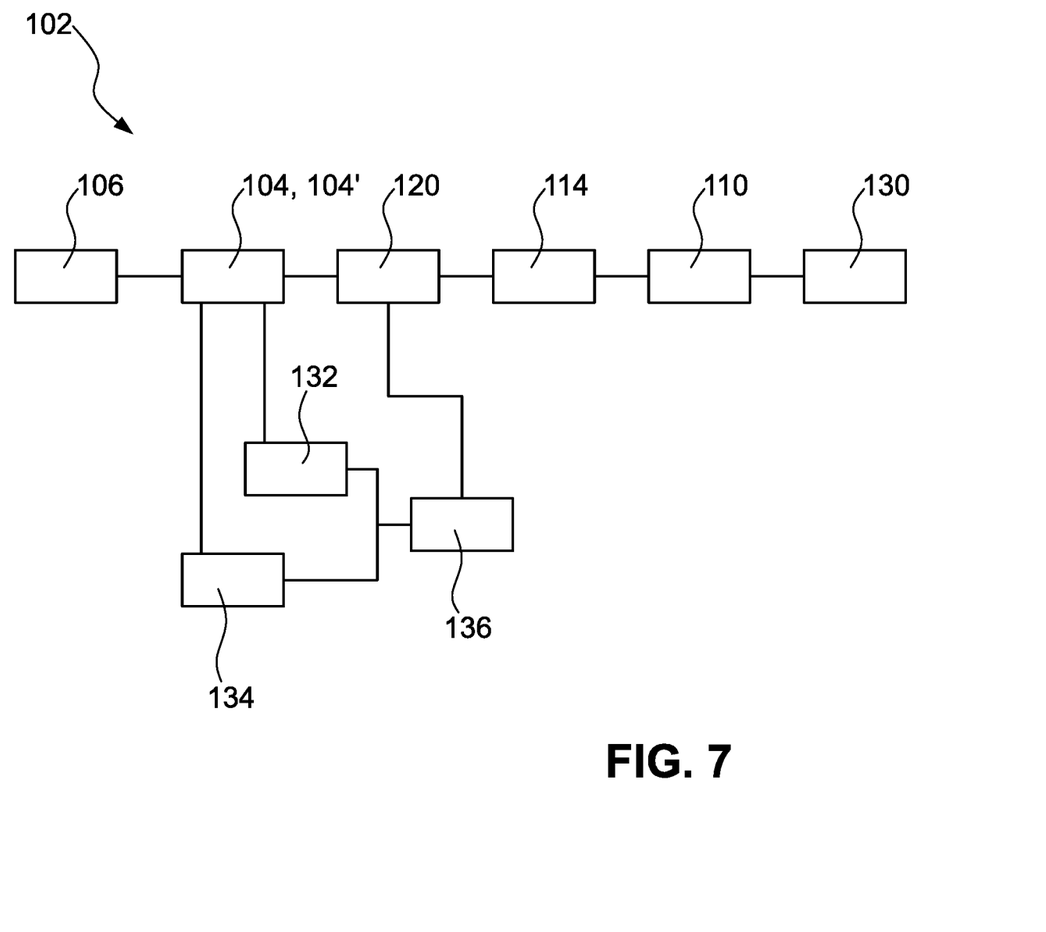
FIG. 7 shows the exemplary embodiment of the brake device according to the present disclosure in FIG. 1 in the form of a block diagram.

FIG. 7 shows the exemplary embodiment of the brake device 102 according to the present disclosure represented in a block diagram. The drive 130 (cf. FIG. 1) generates a drive variable (α), which via the non-linear mechanism 110 is transmitted to a transmission member 114 according to the transmission function H(α) in the manner described above. An adjusting unit 120 is assigned to the transmission member 114 for adjusting the clearance. The transmission member 114 acts in conjunction with the adjusting unit 120 on the brake pads 104, 104' and on actuation presses these against the brake disc 106. For fuller explanations of this reference should be made to the descriptions above.

A brake pad wear sensor 132 is assigned to the brake pads 104, 104' for sensing the degree of wear of the brake pads and/or optionally a temperature sensor 134 for sensing the brake temperature. The sensor(s) 132, 134 have a signal-carrying connection to a control unit 136, which in turn has a signal-carrying connection to the adjusting unit 120 and controls the clearance LS as a function of the sensed degree of wear of the brake pads and the brake pad temperature.

While the above description constitutes the preferred embodiments of the present invention, it will be appreciated that the invention is susceptible to modification, variation and change without departing from the proper scope and fair meaning of the accompanying claims.

What is claimed is:

1. A brake device (102) for a utility vehicle, comprising:
   a brake disc (106),
   at least one brake pad (104, 104'),
   a transmission member (114) coupled to the brake pad (104, 104') for pressing the at least one brake pad (104, 104') against the brake disc (106),
   a drive (130) for generating a drive variable (α),
   a non-linear mechanism (110) operatively connected to the drive (130) and the transmission member (114) for non-linear transmission of the drive variable (α) to the transmission member (114),
   an adjusting unit (120) for adjusting a clearance (108) between the transmission member (114) and the brake disc (106),
   wherein the brake device (102) comprises a brake pad wear sensor (132) for detecting a degree of wear of the at least one brake pad (104, 104'),
   and a control unit (136), which has a signal-carrying connection to the brake pad wear sensor (132) and is configured to vary the clearance (108) as a function of the degree of wear of the brake pad (104, 104') determined by the brake pad wear sensor (132);
   wherein the control unit is configured to increase the clearance (108) as the wear of the brake pad (104, 104') increases.

2. The brake device (102) as claimed in claim 1, wherein the non-linear mechanism (110) is configured to move the transmission member (114) between a retracted position and an extended position along a stroke travel (X), wherein the stroke travel (X) results from a transmission function (H(α)) of the drive variable (α).

3. The brake device (102) as claimed in claim 1, wherein the drive variable (α) is an angle of rotation generated by a drive torque.

4. The brake device (102) as claimed in claim 1, wherein the non-linear mechanism (110) defines a transmission function (H(α)) defined to decrease a rate of variation of the transmission function as the drive variable (α) increases.

5. The brake device (102) as claimed in claim 4, wherein the mechanism (110) has a first working range (I) and a second working range (II), wherein the rate of variation of the transmission function (H(α)) in the second working range (II) is less than in the first working range (I).

6. The brake device (102) as claimed in claim 5, wherein the first working range (I) merges continuously into the second working range (II).

7. The brake device (102) as claimed in claim 1, wherein the adjusting unit (120) comprises a screw actuator for adjusting the clearance (108).

8. The brake device (102) as claimed in claim 1, wherein the device comprises a temperature sensor (134) for detecting the temperature of the at least one brake pad (104, 104'),
   wherein the control unit (136) has a signal-carrying connection to the temperature sensor (134) and is configured to vary the clearance (108) as a function of the temperature of the brake pad (104, 104') determined by the sensor (134).

9. The brake device (102) as claimed in claim 8, wherein the clearance (108) is increased as the temperature of the brake pad (104, 104') diminishes.

10. A method for operating a brake device (102), comprising the following steps:
    generating a drive variable (a);
    transmitting the drive variable (a) to a transmission member (114) via a non-linear mechanism (110);
    detecting a degree of wear of at least one brake pad (104, 104') of the brake device (102);
    varying a clearance (108) between the transmission member (114) and the brake disc (106) as a function of the detected degree of wear of the at least one brake pad (104, 104'); and
    increasing the clearance (108) with increasing wear of the brake pad (104, 104').

11. The method as claimed in claim 10, further comprising the step of moving the transmission member (114) between a retracted position and an extended position along a stroke travel (X), wherein the stroke travel (X) results from a transmission function (H(α)) of the drive variable.

12. The method as claimed in claim 10, further comprising the step of detecting the temperature of the at least one brake pad (104, 104').

13. The method as claimed in claim 10, further comprising the step of varying the clearance (108) as a function of the temperature of the brake pad (104, 104').

14. A brake device (102) for a utility vehicle, comprising:
a brake disc (106),
at least one brake pad (104, 104'),
a transmission member (114) coupled to the brake pad (104, 104') for pressing the at least one brake pad (104, 104') against the brake disc (106),
a drive (130) for generating a drive variable ($\alpha$),
a non-linear mechanism (110) operatively connected to the drive (130) and the transmission member (114) for non-linear transmission of the drive variable ($\alpha$) to the transmission member (114),
an adjusting unit (120) for adjusting a clearance (108) between the transmission member (114) and the brake disc (106),
wherein the brake device (102) comprises a brake pad wear sensor (132) for detecting a degree of wear of the at least one brake pad (104, 104'), and
a control unit (136), which has a signal-carrying connection to the brake pad wear sensor (132) and is configured to vary the clearance (108) as a function of the degree of wear of the brake pad (104, 104') determined by the brake pad wear sensor (132),
wherein the non-linear mechanism (110) defines a transmission function ($H(\alpha)$) defined to decrease a rate of variation of the transmission function as the drive variable ($\alpha$) increases.

15. The brake device (102) as claimed in claim 14, wherein the mechanism (110) has a first working range (I) and a second working range (II), wherein the rate of variation of the transmission function ($H(\alpha)$) in the second working range (II) is less than in the first working range (I).

16. The brake device (102) as claimed in claim 15, wherein the first working range (I) merges continuously into the second working range (II).

\* \* \* \* \*